May 28, 1935.　　　T. B. BUELL　　　2,002,933

TOOL RELIEF MECHANISM

Filed Dec. 23, 1933　　　3 Sheets-Sheet 1

Inventor:
Timothy B. Buell

May 28, 1935.  T. B. BUELL  2,002,933
TOOL RELIEF MECHANISM
Filed Dec. 23, 1933  3 Sheets-Sheet 2
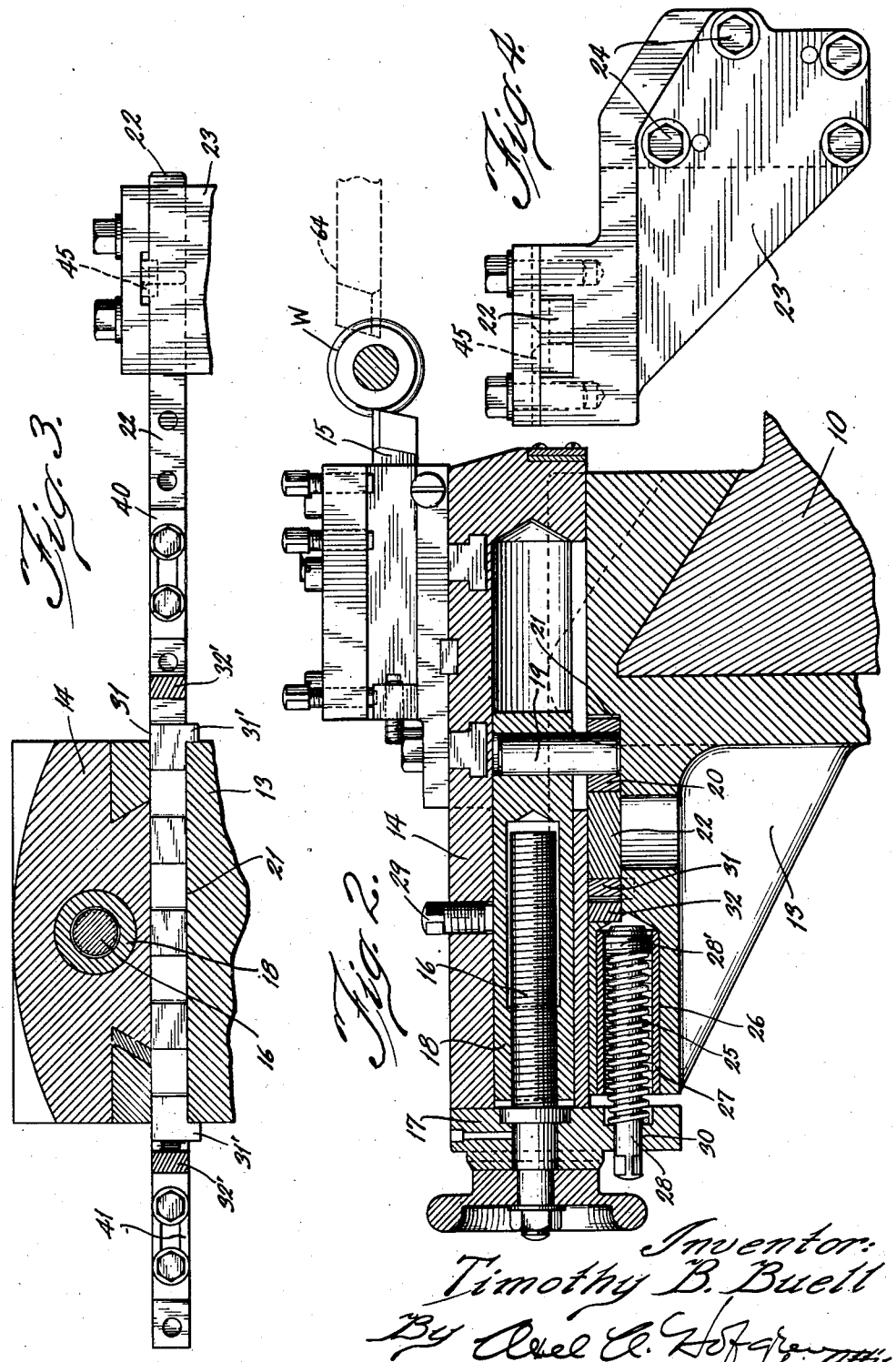
Inventor:
Timothy B. Buell

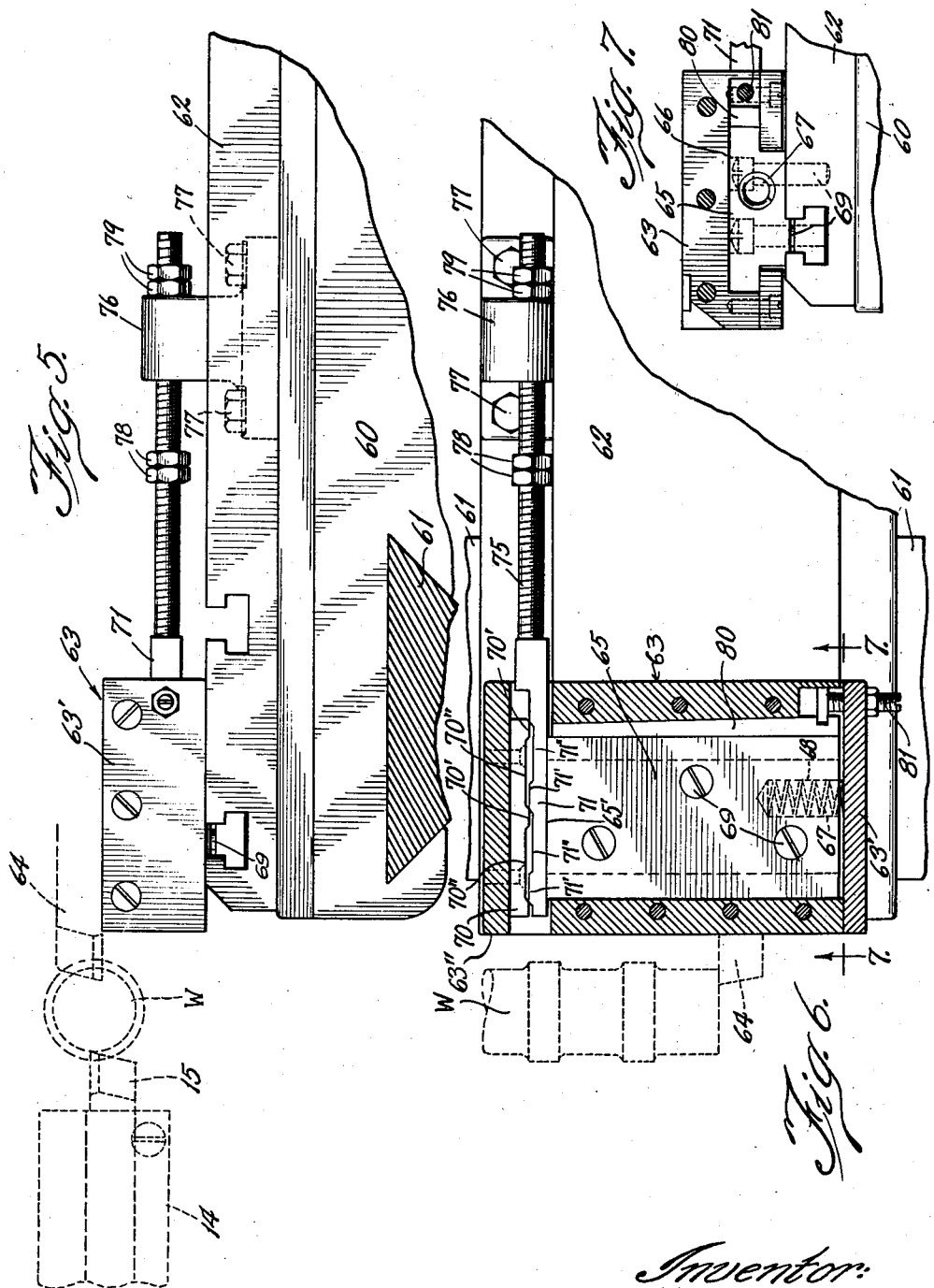

Patented May 28, 1935

2,002,933

UNITED STATES PATENT OFFICE 2,002,933

TOOL RELIEF MECHANISM

Timothy B. Buell, Rockford, Ill., assignor to Sundstrand Machine Tool Co., Rockford, Ill., a corporation of Illinois Application December 23, 1933, Serial No. 703,815

20 Claims. (Cl. 82—14)

More particularly the invention relates to a tool relief mechanism adapted for use on a lathe for the purpose of withdrawing the tool transversely of the line of movement of the tool during the cutting operation, after the completion of the cutting operation and prior to the return movement of the tool support, so that the tool does not mar the finished work.

It is the general object of the invention to provide a new and improved mechanism of this character.

Another object is to provide simple and efficient means for withdrawing the cross slide of a lathe upon completion of a turning operation, which mechanism is adapted, upon the return of the carriage to its starting position, to restore the tool to its proper position.

Another object is to provide, in combination with a lathe carriage having a cross slide thereon and means for moving the cross slide inwardly to engage the tools with the work, mechanism including adjustable dogs for withdrawing the tools slightly from the work prior to the return movement of the carriage.

Another object is to provide in a machine, in combination with a longitudinally movable tool support having a cross slide thereon, means for determining the position of the cross slide on the tool support including a cam bar extending along the path of the support and a follower mounted on the cross slide, and adjustable means for withdrawing the cam bar transversely so as to permit the cross slide to be withdrawn upon the completion of the turning operation and prior to the return movement of the support.

Further objects will become readily apparent from the following description taken in connection with the accompanying drawings, in which:

Fig. 2 is a transverse section approximately along the line 2—2 of Fig. 1.

Fig. 3 is a longitudinal section approximately along the line 3—3 of Fig. 1.

Fig. 4 is a fragmentary end elevation of a supporting bracket.

Fig. 5 is a fragmentary end elevation of a rear tool support.

Fig. 6 is a fragmentary plan view thereof.

Fig. 7 is a fragmentary section along the line 7—7 of Fig. 6.

Figure 1:
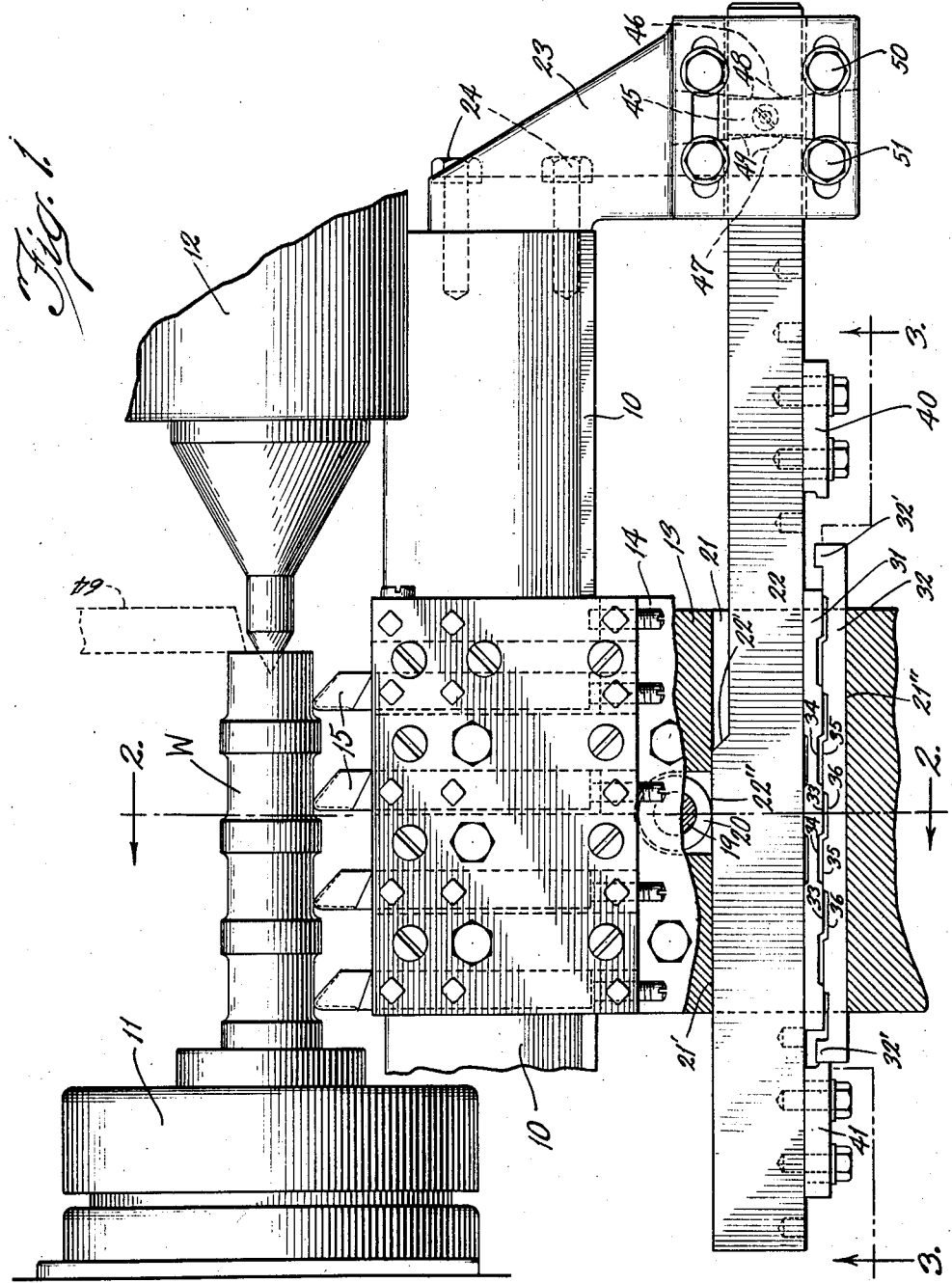
Fig. 1 is a fragmentary plan view of a lathe embodying a preferred form of the invention.

Although I have shown in the drawings and shall herein describe in detail a preferred embodiment of the invention, it is to be understood that I do not intend to limit the invention to the particular arrangement shown, it being contemplated that various changes may be made by those skilled in the art without departing from the spirit and scope of the appended claims.

As illustrated in Figs. 1 to 4 of the drawings, the invention is embodied in a lathe having a bed 10, a rotary work chuck 11, a tailstock 12, a longitudinally movable front carriage 13 mounted on suitable ways on the bed, and a cross tool slide 14 carrying a plurality of cutting tools 15. The cross slide is adjustable toward and from the work W by means of a screw device 16 rotatably mounted in a bracket 17 on the front end of the cross slide. The screw device engages screw threads in the forward end of a hollow cylindrical member 18 which is positioned in a recess in the cross slide, and carries a vertically extending pin 19 having a roller 20 on its lower end. The roller 20 extends into a longitudinal recess 21 in the carriage 13 and, as illustrated most clearly in Fig. 1, is arranged to engage a cam bar 22 which extends longitudinally through the recess 21 of the carriage and is secured at the tail end of the lathe to a bracket 23 which is secured to the bed by means of a plurality of bolts 24. The cross slide is normally urged toward its forward or withdrawn position by means of a coiled spring 25 (Fig. 2) positioned in a recess 26 in the front part of the carriage 13. Said recess is preferably lined with a threaded bushing 27, a rod 28 extending through the spring and having a screw threaded end 28' engaging in the bushing. The spring at its other end engages the bracket 17, the rod 27 extending through an aperture 30 in said bracket. Thus the cross slide is normally urged outwardly so that the roller 20 is in engagement with the cam bar 22, the cross slide being arranged to move inwardly to its cutting position during the longitudinal movement of the carriage when the roller engages an inclined portion 22' on the cam bar and rides up on a surface 22'' of the wider portion thereof. The member 18 forms a part of the cross slide and is adjustable so as to permit an operator to move the tool holding portion of the slide transversely of the carriage and relatively to the roller 20 which engages the cam bar. Preferably a set screw 29 is provided which may be moved into clamping engagement with the member 18 after the member has been adjusted.

In the exemplary embodiment of the invention, a slight withdrawal movement of the tool slide at the end of the cutting stroke is obtained by moving the cam bar 22 away from the axis of the work, thus permitting the spring 25 to withdraw the cross slide. To permit this movement the cam bar is normally held in engagement with the inner wall 21' (Fig. 1) of the recess 21 by means of a pair of longitudinally extending members or bars 31 and 32 positioned intermediate the forward edge of the cam bar and the forward wall 21'' of the recess 21. The bar 31 has a plurality of longitudinally spaced projections or pads 33 with intervening recesses 34, whereas the bar 32 has a plurality of similar pads or projections 35 and recesses 36 so arranged that when the pads 33 of the bar 31 are in engagement with the pads 35 of the bar 32, as illustrated in Fig. 1, the cam bar 22 is held in its operative position against the inner wall 21' of the recess 21. When, however, the bar 32 is moved longitudinally with respect to the bar 31 so that the pads 33 project into the recess 36 and the pads 35 project into the recess 34, the cam bar 22 can move in the recess 21 away from the work axis, thus permitting a slight withdrawal movement of the tools.

The bar 31 is provided with downwardly extending lugs 31' (Fig. 3) at its opposite ends engaging the ends of the carriage 13 so as to move with the carriage. The bar 32 projects outwardly beyond the ends of the bar 31 and has horizontally extending lugs 32'. The bar 32 is arranged to be moved longitudinally with respect to the bar 31 by means of dogs 40 and 41 secured to the adjacent edge of the cam bar 22 by means of screw devices. Thus, assuming that the carriage 13 is moving toward the left (Fig. 1), during a turning operation, toward the head of the lathe, the dog 41 is so positioned that it engages the adjacent end of the bar 32 and, as the end of the cut is reached, the bar 32 has been held against movement with the carriage sufficiently so that the pads on the bar 31 enter the recesses on the bar 32. This permits the withdrawal movement of the tools during the return stroke. When the carriage has returned to its initial or starting position, the other end of the bar 32 will have engaged the dog 40 causing the pads 33 and 35, which are appropriately provided with inclined end surfaces, to ride up on each other so as to return the cam bar to its normal operative position.

In order to permit the lateral movement of the cam bar, the right-hand end of the bar is herein pivotally mounted on the bracket 23, a transversely extending member 45 secured to the bar being positioned between a pair of opposed members 46 and 47 having V-shaped ends 48 and 49, the members 46 and 47 being secured to the bracket by suitable bolts 50 and 51.

In the form illustrated in Figs. 1 to 4 of the drawings, the inclined portion 22' of the cam bar is so positioned that as the carriage 13 reaches its starting position the cross slide is withdrawn by the action of the spring 25 a substantial distance from the work so as to facilitate the removal of the finished work piece and replacing it with a work blank. The inclined portion 22' also serves to return the tools to their operative position with relation to the work when the carriage is moved toward the left (Fig. 1), from its withdrawn position. In Fig. 1 the tool support is illustrated as approaching the end of the feeding stroke, the follower 20 being in engagement with the cam surface 22''.

The bar 32 which is movably mounted on the carriage serves as a means for backing up the cam bar 22 and the tool slide 14 and for maintaining the tool slide in its normal operative position during a turning operation, the bar 32 being movable prior to the reversal of the carriage so as to be ineffective to maintain the cam bar and tool slide in their operative positions and permit a slight withdrawal movement of the tool slide. As illustrated herein, the dogs 40 and 41 are shown bolted to the cam bar so as to be stationarily mounted, but it will be readily apparent that they may be mounted in different ways, and that when bolted to a support preferably a number of bolt holes are provided so that the dogs may be adjusted longitudinally of the work.

In the preferred form of the invention the actuating means for the cross slide comprises a cam bar and follower and it is believed readily apparent that, by providing means for moving bodily the cross slide and its actuating means, a simple tool relief mechanism is obtained. Furthermore the construction shown is automatic in its operation during a reciprocatory movement of the carriage 13.

As illustrated in Figs. 5 to 7, a rear carriage 60 is mounted for adjustment longitudinally of the rear portion 61 of the bed of the lathe, the rear carriage generally being clamped to the bed during normal operation of the machine. A rear tool support 62 is slidably mounted on the carriage 60 for movement toward and away from the work W and carries a tool slide 63 adjacent its forward end. A tool indicated diagrammatically at 64 is mounted in an inverted position on the tool slide 63 and is adapted to perform a facing operation on the work W.

In the operation of the rear tool support the support is moved forwardly toward the work by suitable mechanism (not shown) to engage the tool therewith and, upon the completion of the forward stroke, the tool slide 63 is arranged to be withdrawn longitudinally of the work axis prior to the return movement of the support so that the tool will not contact the finished end surface of the work. As illustrated herein, the tool slide 63 is slidable transversely on the support 62 and longitudinally of the work, a T-shaped block 65 (Figs. 6 and 7), which is secured to the support 62 by screw devices 69, engaging in a T-shaped slot 66 formed in the tool slide 63. The tool slide has an end plate 63' and a coiled spring 67 is positioned in a recess 68 in the T-shaped member 65 so that its outer end is in engagement with the end plate 63' to urge the tool slide 63 toward a withdrawn position.

The operative position of the tool slide 63 is determined by a pair of members 70 and 71 positioned between opposed surfaces on the support 62 and slide 63, the member 70 being secured to an end member 63'' on the tool slide 63 and the member 71 being positioned between the adjacent end 65' of the T-shaped member 65 and the member 70. The member 70 is provided with a plurality of projecting portions or pads 70' spaced longitudinally of the member by means of recesses 70''. The member 71 has corresponding projecting portions 71' spaced apart by recesses 71''. When the portions 70' of the member 70 are in engagement with the ends of the portions 71' of the member 71, the tool slide 63 is in its operative position. The relieving operation is performed by moving the member 71 longitudinally of the member 70 so that the projecting portions of the member 71 move into the recesses of the member 70, thereby permitting the spring 67 to move the tool slide longitudinally of the work (downwardly in Fig. 6)

to withdraw the tool 64 from contact with the end of the work.

Preferably the member 71 is arranged to be operated automatically upon completion of the forward or feeding movement of the tool support 62. As illustrated herein a threaded rod 75 is secured to the member 71 and extends rearwardly thereof and through an opening in an upstanding bracket 76 which is secured to the carriage 60 by means of screw devices 77. Adjustable nuts 78 and 79 are threaded onto the rod 75 on opposite sides of the bracket 76 to act as dogs, and may be adjusted longitudinally of the rod. Thus during the forward movement of the tool support 62, the rod 75 is moved therewith until the nuts 79 engage the bracket 76, thus arresting the movement of the rod 75 and the member 71 until the projecting portions 71' of the member 71 enter the recesses 70'' of the member 70. In Figs. 5 and 6 the member 71 is shown in a position wherein the projecting portions 71' are just about to enter the recesses 70''. During the return movement of the tool support 62 and as the support reaches its withdrawn position, the nuts 78 engage the other end of the bracket 76 again arresting the rod 75 and causing the projecting portions of the members 70 and 71 to ride up onto each other over their inclined ends and return the tool slide 63 to its normal operative position.

As illustrated herein, a taper gib 80 is positioned intermediate the rear edge of the T-shaped member 65 and the adjacent wall of the T-slot 66 so that any lost motion may be taken up, the taper gib being adjustable by means including a screw device 81.

In this form of the invention also the relief movement is at right angles to the feeding movement of the tool, the tool 64 being illustrated in a position to perform a facing operation on the end of the work W. The bracket 76 serves as a relatively stationary abutment so far as the movement of the tool support 62 is concerned, and is effective to engage the nut devices or dogs 78 and 79 for the purpose of engaging and disengaging the projecting portions of the members 70 and 71.

I claim as my invention:

1. In a lathe having a bed, rotatably mounted work supporting means, a carriage movable longitudinally of the work axis, and a tool slide mounted on the carriage for movement toward and away from the work, in combination, a cam bar supported on the bed extending longitudinally through a recess in the carriage, a roller carried on the cross slide arranged to engage the inner edge of the cam bar to determine the path of the tool along the work during a turning operation, resilient means normally urging the tool slide away from the work acting to hold said roller against the surface of the cam bar, and means for withdrawing the tool slide from the work upon the completion of the turning operation and prior to the return movement of the carriage comprising means normally holding said cam bar in its operative position, and means operable upon the completion of the turning operation to release said holding means and permit said resilient means to withdraw the cross slide, said means comprising a pair of relatively movable parts positioned intermediate the forward edge of the cam bar and the carriage, said parts having projecting portions arranged to interengage to hold the cam bar in its normal position and each part having recesses adapted to receive the projecting portions of the other part to permit movement of the cam bar away from the work, a dog secured to said cam bar adapted to engage the end of one of said parts during movement of the carriage to move said part into interfitting engagement with the other part at the completion of the cutting operation, and a second dog arranged to engage said movable part as the carriage returns to its starting position to interengage the projecting portions of said parts and return the cam bar to its normal position.

2. In a lathe having a bed, rotatably mounted work supporting means, a carriage movable longitudinally of the work axis, and a tool slide mounted on the carriage for movement toward and away from the work, in combination, a cam bar extending longitudinally past the carriage, a follower carried on the cross slide arranged to engage one edge of the cam bar to determine the path of the tools along the work during a turning operation, means normally holding said cam bar in its operative position, and means for withdrawing the cam bar and tool slide upon the completion of the turning operation and prior to the return movement of the carriage, said means comprising a pair of relatively movable parts positioned on the carriage, said parts having portions interengageable to hold the cam bar in its normal position and disengageable to permit movement of the cam bar away from the work, a dog secured to said cam bar adapted to engage one of said parts during movement of the carriage to disengage said parts at the completion of the cutting operation, and a second dog arranged to engage said movable part as the carriage returns to its starting position to interengage said parts and return the cam bar to its normal position.

3. In a lathe having a bed, rotatably mounted work supporting means, a longitudinally movable tool carriage, and a transversely movable tool slide on said carriage, in combination, a bracket secured to the bed and extending forwardly therefrom, a cam bar extending longitudinally of the bed through a recess in said carriage beneath the cross slide, means securing one end of said cam bar pivotally to said bracket so that the free end of the cam bar may swing slightly with the cross slide toward and from the work, a follower on the cross slide engaging the rear of the cam bar, resilient means normally urging the cross slide forwardly so as to maintain said follower in engagement with the cam bar, means for holding said cam bar in a normal operative position substantially parallel to the axis of the work comprising a first member positioned in said carriage recess along the forward side of the cam bar, and a second member positioned in said recess between the first member and the forward wall of the recess, said members having a plurality of projecting portions interengageable to hold the cam bar in its rear position and disengageable to permit the cam bar to move forwardly in the recess, means for securing one of said members to the carriage, and means for moving the other of said members relatively to the carriage during the longitudinal movement of the carriage comprising a dog secured to said cam bar.

4. In a lathe having a bed, rotatably mounted work supporting means, a tool support, and a tool slide mounted on the support for movement toward and away from the work, in combination, means normally holding said tool slide in its operative position, and means for withdrawing the tool slide upon the completion of a cutting operation and prior to the return movement of the tool support, said means comprising a pair of relatively movable parts positioned intermediate opposed surfaces on the tool support and tool slide, said parts having portions interengageable to hold the tool slide in its normal operative position and disengageable to permit movement of the tool slide away from the work, and means adapted to engage one of said parts during movement of the tool support to disengage said portions at the completion of the cutting operation.

5. In a lathe having a bed, rotatably mounted work supporting means, a carriage movable longitudinally of the work axis, and a tool slide mounted on the carriage for movement toward and away from the work, in combination, a cam bar extending longitudinally past the carriage, a follower carried on the cross slide arranged to engage one edge of the cam bar to determine the path of the tools along the work during a turning operation, means normally holding said cam bar in its operative position, and means for withdrawing the cam bar and tool slide upon the completion of the turning operation and prior to the return movement of the carriage, said means comprising a pair of relatively movable parts positioned on the carriage, said parts having portions interengageable to hold the cam bar in its normal position and disengageable to permit movement of the cam bar away from the work.

6. In a lathe having a bed, rotatably mounted work supporting means, a carriage movable longitudinally of the work axis, and a tool slide mounted on the carriage for movement toward and away from the work, in combination, a cam bar supported on the bed extending longitudinally through a recess in the carriage, a roller carried on the cross slide arranged to engage the inner edge of the cam bar to determine the path of the tool along the work during a turning operation, resilient means normally urging the tool slide away from the work acting to hold said roller against the surface of the cam bar, and means for withdrawing the tool slide from the work upon the completion of the turning operation and prior to the return movement of the carriage comprising means normally holding said cam bar in its operative position, and means operable upon the completion of the turning operation to release said holding means and permit said resilient means to withdraw the cross slide.

7. In a lathe having a bed, rotatably mounted work supporting means, a longitudinally movable tool carriage, and a transversely movable tool slide on said carriage, in combination, a bracket secured to the bed and extending forwardly therefrom, a cam bar extending longitudinally of the bed through a recess in said carriage beneath the cross slide, means securing one end of said cam bar pivotally to said bracket so that the free end of the cam bar may swing slightly with the cross slide toward and from the work, a follower on the cross slide engaging the rear of the cam bar, resilient means normally urging the cross slide forwardly so as to maintain said follower in engagement with the cam bar, means for holding said cam bar in a normal operative position substantially parallel to the axis of the work during a turning operation, and means for releasing said holding means prior to the return movement of the carriage to permit said bar to move away from the work.

8. In a lathe having a bed, rotatably mounted work supporting means, a carriage movable longitudinally of the work axis, and a tool slide mounted on the carriage for movement toward and away from the work, in combination, a cam bar extending longitudinally past the carriage and transversely of the tool slide, having two positions relative to the latter, a follower carried on the cross slide arranged to engage one edge of the cam bar to determine the path of the tools along the work during a turning operation, means normally holding said cam bar in one operative position relative to the slide, and means for withdrawing the cam bar to its other position and for withdrawing the tool slide upon the completion of the turning operation and prior to the return movement of the carriage.

9. In a lathe having a bed, rotatably mounted work supporting means, a longitudinally movable tool carriage, and a transversely movable tool slide on said carriage, in combination, a bracket secured to the bed and extending forwardly therefrom, a cam bar extending longitudinally of the bed past said carriage, means securing one end of said cam bar pivotally to said bracket so that the free end of the cam bar may swing slightly with the cross slide toward and from the work, a follower on the cross slide engaging the rear of the cam bar, means for holding said cam bar in a normal operative position substantially parallel to the axis of the work comprising a member movably mounted on the carriage, and means for moving said member relatively to the carriage during the longitudinal movement of the carriage to effect a withdrawal movement of the cross slide from the work prior to the return movement of the carriage.

10. In a lathe having a bed, rotatably mounted work supporting means, a longitudinally movable tool carriage, and a transversely movable tool slide on said carriage, in combination, a supporting member extending from the bed, a cam bar extending longitudinally of the bed past said carriage, means securing one end of said cam bar to said supporting member so that the free end of the cam bar may move with the cross slide toward and from the work, a follower on the cross slide engaging the rear of the cam bar, means for moving the cross slide forwardly so as to maintain said follower in engagement with the cam bar, means for holding said cam bar in a normal operative position including an element movably mounted on the carriage, and a plurality of dogs for moving said element relatively to the carriage during the longitudinal movement of the carriage.

11. In a machine tool, in combination with a longitudinally movable support and a slide movable transversely on said support, means for moving said slide comprising a cam bar extending along the path of the support, a follower carried on said slide, and resilient means for urging the slide toward its withdrawn position, and means for permitting a slight withdrawal movement of the cam bar and slide upon the completion of the longitudinal movement of the support in one direction, said means comprising a member movably mounted on said support and normally backing up the cam bar, and means for moving said member relatively to the support to withdraw the cam bar.

12. In a machine tool, in combination with a longitudinally movable support and a slide movable transversely on said support, means for moving said slide comprising a cam bar extending along the path of the support, a follower carried on said slide, and resilient means for urging the slide toward its withdrawn position, means for permitting a slight withdrawal movement of the slide upon the completion of the longitudinal movement of the support in one direction, said means comprising a member movably mounted on said support and backing up the cam bar, and means for moving said member relatively to the support to release the cam bar comprising a dog secured to the cam bar.

13. In a machine tool, in combination with a movable tool support, a slide movable transversely on said support, resilient means urging said slide to retracted inoperative position, means for holding said slide in its normal operative position against the action of said resilient means and for permitting a slight withdrawal movement of the slide upon the completion of the cutting movement of the support comprising a member movably mounted on said support normally backing up the slide, a first dog for moving said member relatively to the support to effect a withdrawal of the slide prior to the return movement of the support, and a second dog for moving said member to return the slide to its normal operative position at the end of the return movement of the support.

14. In a machine tool, in combination with a longitudinally movable support and a slide movable transversely on said support, means for moving said slide comprising a cam bar extending along the path of the support and having two operative positions relative to said slide, a follower carried on said slide, and resilient means for urging the slide toward its withdrawn position, and means for permitting a slight withdrawal movement of the cam bar and slide upon the completion of the longitudinal movement of the support in one direction.

15. In a lathe having, in combination, rotatably mounted work supporting means, a tool support arranged to be moved toward and from the work, a tool slide mounted on said support for movement longitudinally of the work axis, means normally holding said tool slide in its operative position comprising a pair of relatively movable parts positioned intermediate opposed surfaces on the tool support and slide having portions interengageable to hold the tool slide in its operative position, and means for withdrawing the tool slide upon the completion of the cutting operation and prior to the return movement of the tool support comprising means for disengaging said portions of said parts.

16. In a lathe having, in combination, a bed, rotatably mounted work supporting means, a reciprocatory tool support, a tool slide movable transversely on said support, means for holding said tool slide so that tools thereon engage the work during feeding movement of the tool support comprising a member slidably mounted on the tool support and normally backing up said tool holder, and means for moving said member to withdraw the tool slide upon completion of a cutting operation and prior to the return movement of the tool support.

17. In a lathe having a longitudinally movable carriage and a cross tool slide on said carriage, in combination, means for actuating said cross slide, and means operable upon the completion of the forward movement of the carriage to withdraw the cross slide and its actuating means to remove the tools from contact with the work during the return stroke of the carriage, said means comprising means for holding the actuating means in its normal operative position, and means including a dog effective to release said holding means.

18. In a lathe having a bed, rotatably mounted work supporting means, a carriage movable longitudinally of the work axis, and a tool slide mounted on the carriage for movement toward and away from the work, in combination, a cam bar supported on the bed extending longitudinally of the carriage, means carried on the cross slide arranged to engage the inner edge of the cam bar to determine the path of the tool along the work during a turning operation, means for withdrawing the tool slide from the work upon the completion of the turning operation and prior to the return movement of the carriage comprising means normally holding said cam bar in its operative position, means operable upon the completion of the turning operation to release said holding means and common resilient means urging the means on the cross slide into engagement with said cam and said cam and slide to withdrawn position.

19. In a machine having a bed, rotatably mounted work supporting means, a support movable longitudinally of the work axis, and a cross slide mounted on the support for movement toward and away from the work, in combination, a first element comprising a cam, a second element comprising a follower, one of said elements being mounted on the cross slide, and means for withdrawing the slide from the work upon the completion of the movement of the support in one direction and prior to the return movement of the support comprising means normally holding the other of said elements in its operative position, and means operable upon the completion of the support movement to release said holding means and permit the withdrawal of the slide.

20. In a lathe having, in combination, rotatably mounted work supporting means, a rear tool carriage, a tool support on said carriage, a tool slide mounted on said support for movement longitudinally of the work axis, means holding the tool slide in a normal operative position comprising a pair of relatively movable parts positioned intermediate opposed surfaces of the tool slide and support, said parts having portions interengageable to hold the tool slide in its normal position and disengageable to permit movement of the tool slide to move the tool away from the work, resilient means acting when said portions are disengaged to move the tool slide away from the work, and means for moving one of said parts relative to the other comprising a bracket secured to said carriage and having an opening through which a portion of said part extends, and dogs on said part engageable with said bracket.

TIMOTHY B. BUELL.